United States Patent

Blase et al.

[11] Patent Number: 5,906,182
[45] Date of Patent: May 25, 1999

[54] ENGINE PISTON

[75] Inventors: James Leonard Blase, Lemont; Richard Wayne Tupek; Chih Lance Liu, both of Naperville, all of Ill.

[73] Assignee: General Motors Corporation, Detroit, Mich.

[21] Appl. No.: 09/027,697

[22] Filed: Feb. 23, 1998

Related U.S. Application Data

[60] Provisional application No. 60/041,459, Mar. 25, 1997.

[51] Int. Cl.$^6$ .......................................................... F16J 1/16
[52] U.S. Cl. .......................................................... 123/193.6
[58] Field of Search ........................... 123/193.6; 92/201, 92/205

[56] References Cited

U.S. PATENT DOCUMENTS

| | | | |
|---|---|---|---|
| 5,144,884 | 9/1992 | Kelly | 123/193.6 |
| 5,261,363 | 11/1993 | Kemnitz | 123/193.6 |
| 5,323,744 | 6/1994 | Kusama et al. | 123/193.6 |
| 5,601,010 | 2/1997 | Sawada et al. | 123/193.6 |
| 5,746,169 | 5/1998 | Isslet et al. | 123/193.6 |

*Primary Examiner*—Marguerite McMahon
*Attorney, Agent, or Firm*—Karl F. Barr, Jr.

[57] ABSTRACT

The present invention relates to a piston for an internal combustion engine. The piston includes a crown defined by a combustion surface and a cylindrical ring belt. The cylindrical ring belt has a first and a second ring groove extending about the circumference thereof, where the ring grooves are adapted to receive a first and a second piston ring. The combustion surface and the first ring groove define a first ring land therebetween. The first ring groove and the second ring groove define a second ring land therebetween. The cylindrical ring belt also has an elastic groove extending about the circumference thereof. The elastic groove has an upper wall and a lower wall interconnected by a radius "R", where the upper wall and the lower wall pivot about the radius "R", under loading of the piston to lower stress concentration within the crown.

6 Claims, 2 Drawing Sheets

ENGINE PISTON

This application claims priority from Provision Application Ser. No. 60/041,459, filed Mar. 25, 1997.

TECHNICAL FIELD

The invention is directed to pistons for internal combustion engines.

BACKGROUND

When designing an internal combustion engine, it is desirable to optimize fuel economy, emissions, and durability. One means of improving fuel economy and lowering emissions may be to reduce the cylinder wall crevice volume where unburned hydrocarbons avoid combustion. The cylinder wall crevice volume is defined by the top ring land, the top compression ring, and the engine block cylinder wall. To reduce this crevice volume, the top ring land height may be decreased.

Another means of improving fuel economy may be to reduce the ring thickness which lowers engine friction. These designs expose the top ring to higher temperatures. To facilitate heat dissipation from the top ring, an internal cooling chamber disposed within the piston crown may be located adjacent the top ring groove. A coolant such as oil flowing through the chamber, transfers heat from the piston crown adjacent the top ring groove. Optimizing the shape of the chamber adjacent the top ring groove may increase stress concentrations in the ring belt that are created by combustion forces during engine operation. See FIG. 1.

SUMMARY OF THE INVENTION

The present invention provides a piston design for reducing the thermal and mechanical stresses in the piston ring belt. The piston includes a crown or head portion that defines the top, combustion exposed surface thereof. Depending from the piston crown is a ring belt having a ring groove with a compression ring disposed therein, and an elastic groove, having an internal radius, extending thereabout. The elastic groove does not receive a piston ring but allows the crown to flex elastically, thereby reducing thermal and mechanical stresses. The location of the elastic groove may vary depending on the particular application.

DESCRIPTION OF THE PREFERRED EMBODIMENT

Figure 2:
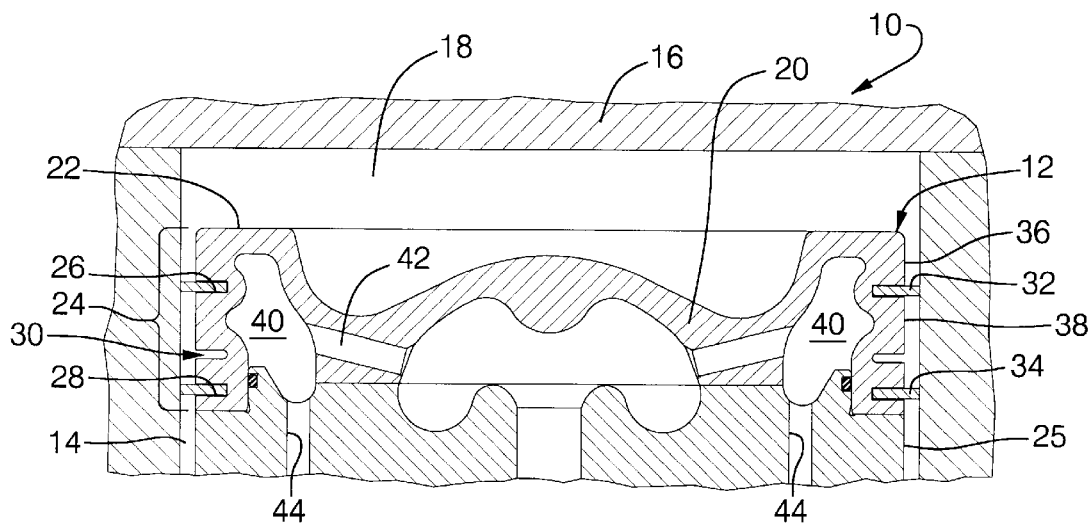
FIG. 2 is a schematic side view, in section, of a portion of an internal combustion engine which includes a piston embodying features of the present invention.

In FIG. 2 there is illustrated an internal combustion engine, generally referred to as 10, having a piston 12 disposed for reciprocal movement in an engine cylinder 14. The piston 12 and cylinder head 16 cooperate to define a combustion chamber 18 therebetween. The piston 12 further includes a crown 20 that defines a top, combustion exposed surface 22 in the combustion chamber 18 and a cylindrical ring belt 24. Extending from the ring belt 24 is a piston skirt 25.

The cylindrical ring belt 24 has first and second ring grooves 26,28 respectively, and an elastic groove 30, extending about its circumference. The ring grooves 26,28 are adapted to receive first and second piston rings 32,34 respectively, which operate to contain the combustion event within the combustion chamber 18, and to prevent the passage of oil from the engine crankcase, not shown, to the combustion chamber 18. The elastic groove 30 does not receive a piston ring.

A first or top ring land 36 is defined between the top surface 22 of the piston and the first ring groove 26 and, a second ring land 38 is defined between the first and second ring grooves 26,28. In the preferred embodiment shown in FIG. 2, the elastic groove 30 is disposed in the second ring land 38. The location of the elastic groove 30 is variable depending on the particular application and is positioned to optimize the distribution of stresses along the ring belt 24.

An internal cooling chamber 40 may be located internally of the piston crown 20. The chamber 40 extends circumferentially about the crown 20, and adjacent to the first ring groove 26 so as to facilitate heat dissipation from the first piston ring 32. Engine oil enters the cooling chamber 40 through passage 42 and circulates through the chamber to exit through outlet 44. As the oil circulates, it removes heat from the crown 20, thereby reducing thermal stresses therein.

Figure 1:
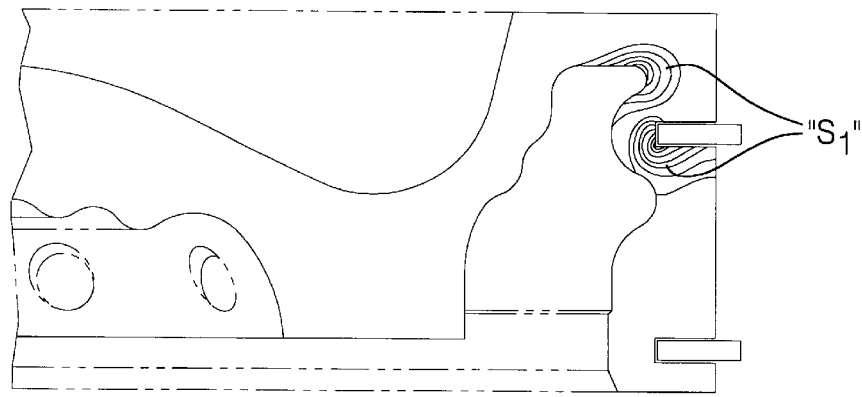
FIG. 1 is a schematic view of a piston, illustrating the significant combustion induced stress concentration in a piston crown without the present invention.
Figure 3:
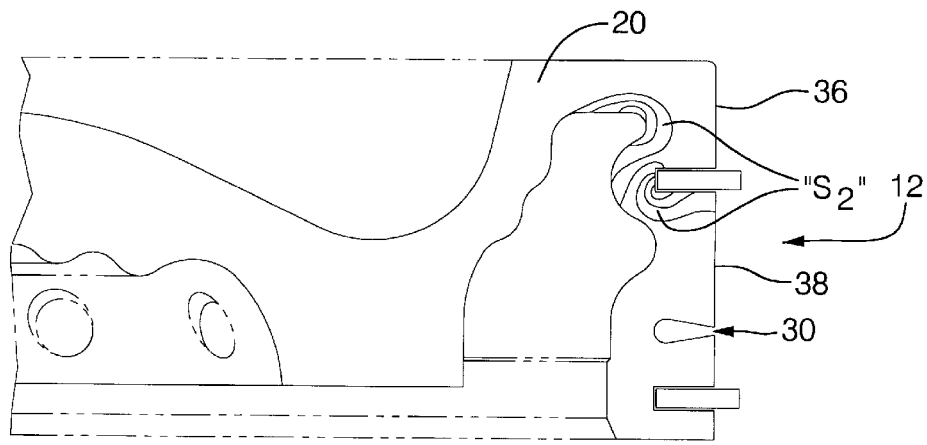
FIG. 3 is a schematic view of a piston, illustrating the reduction in combustion induced stress concentration in a piston crown with the present invention.
Figure 4:
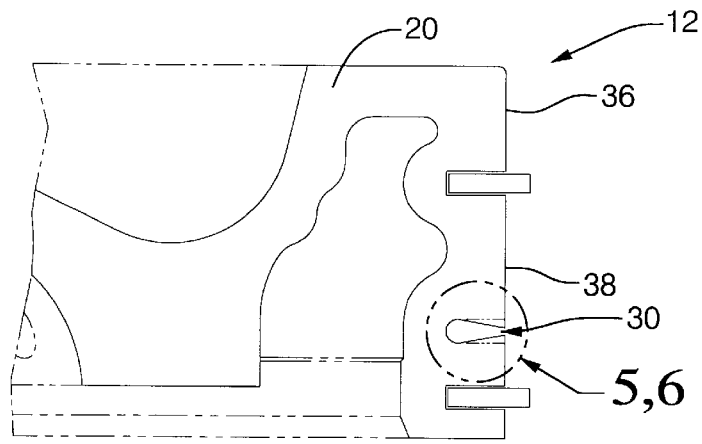
FIG. 4 is a schematic view of a piston crown with the present invention under combustion loading illustrating exaggerated elastic flexation of the elastic groove.
Figure 5:
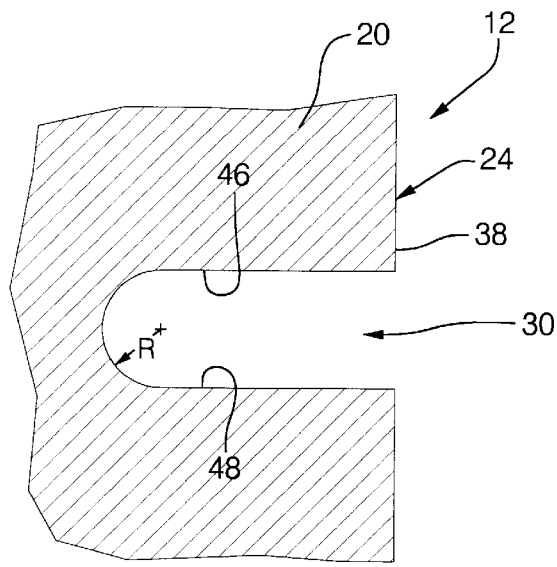
FIG. 5 is an enlarged view of the elastic groove of the present invention, in an unloaded state.
Figure 6:
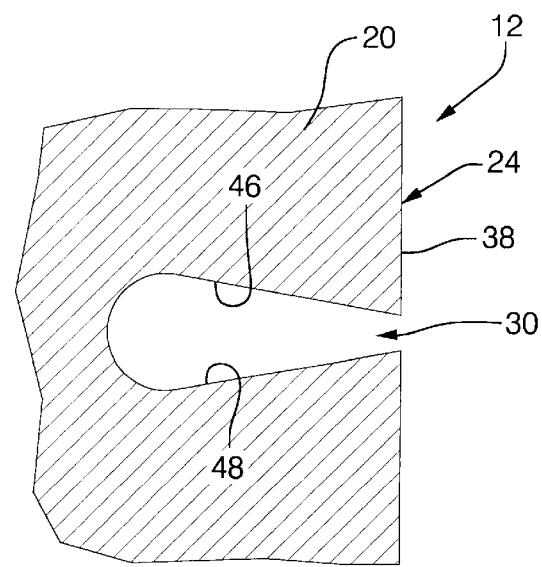
FIG. 6 is an enlarged view of the elastic groove of the present invention under combustion loading.

The combustion event produces high forces and stresses within the piston 12. FIG. 1 illustrates stress fields "$S_1$" produced in a piston crown of a piston without the present invention, whereas FIG. 3 demonstrates a reduction in stresses with the addition of the elastic groove 30 of the present invention. As shown in FIGS. 4, 5, and 6, the elastic groove 30 is formed by an upper wall 46 and a lower wall 48, interconnected by a generous internal radius "R". During the combustion event, forces exerted on the combustion surface 22 are transmitted through the piston crown 20, resulting in a partial closure of the elastic groove 30 through elastic pivoting of the upper and lower walls 46,48 about the radius "R". The movement of walls 46,48 reduces stress concentration produced in the areas of the first ring groove 26 and the internal cooling chamber 40, by redistributing stresses throughout the crown 20, thereby generating a more acceptable level of stress concentration "$S_2$" as seen in FIG. 3. A generous internal radius "R" is required so as to not create stress concentrations at the interior of the elastic groove 30, thereby reducing the risk of crack formation.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

We claim:

1. An engine including a piston having a cylindrical ring belt, said cylindrical ring belt having a ring groove extending about the circumference thereof adapted to receive a ring and an elastic groove extending about the circumference thereof and operable to elastically close under loading of said piston, to thereby lower stress concentration therein.

2. An engine including a piston having a crown defined by a combustion surface and a cylindrical ring belt, depending from said combustion surface to terminate in a skirt portion, said cylindrical ring belt having a first ring groove extending about the circumference thereof and adapted to receive a firs ion ring, said combustion surface and said first ring groove defining a first ring land therebetween, said cylindrical ring belt having a second ring groove extending about the circumference thereof and adapted to receive a second ring, said first ring groove and said second ring groove defining a second ring land therebetween, said cylindrical ring belt having an elastic groove extending about the circumference thereof, said elastic groove having an upper wall and a lower wall interconnected by a radius "R" and operable to pivot about said radius "R" under loading of said piston, to thereby lower stress concentration therein.

3. An engine, as defined in claim 2, wherein said elastic groove is disposed in and extends about said second ring land.

4. An engine, as defined in claim 3, wherein said crown includes an internal cooling chamber, said internal cooling chamber extending adjacent to said first ring groove operable to remove heat from said crown.

5. A piston for an internal combustion engine comprising a crown defined by a combustion surface and a cylindrical ring belt, depending from said combustion surface, said cylindrical ring belt having a ring groove extending about the circumference thereof, and adapted to receive a compression ring, and an elastic groove extending about the circumference thereof, and operable to close under loading of said piston to thereby lower stress concentration therein.

6. A piston for an internal combustion engine comprising a crown defined by a combustion surface and a cylindrical ring belt, depending therefrom, to terminate in a skirt portion, wherein said crown includes an internal cooling chamber, said cylindrical ring belt having a first ring groove extending about the circumference thereof and adapted to receive a first compression ring, said internal cooling chamber adjacent to said first ring groove and operable to remove heat from said crown, said combustion surface and said first ring groove defining a first ring land therebetween, said cylindrical ring belt having a second ring groove extending about the circumference thereof and adapted to receive a second ring, said first ring groove and said second ring groove defining a second ring land therebetween, said cylindrical ring belt having an elastic groove extending about the circumference thereof, said elastic groove having an upper wall and a lower wall interconnected by a radius "R" and operable to pivot about said radius "R", under loading of said piston to thereby lower stress concentration therein.

* * * * *